United States Patent [19]

Platter et al.

[11] Patent Number: 5,433,848
[45] Date of Patent: * Jul. 18, 1995

[54] WATER FILTRATION PUMP WITH DISPOSABLE FILTER CARTRIDGES

[75] Inventors: Sanford Platter; Jeffrey K. Aldred; Richard J. Kreamer, all of Boulder, Colo.

[73] Assignee: KPA, Inc., Longmont, Colo.

[*] Notice: The portion of the term of this patent subsequent to Nov. 22, 2011 has been disclaimed.

[21] Appl. No.: 682,650

[22] Filed: Apr. 9, 1991

[51] Int. Cl.⁶ .............................................. B01D 35/26
[52] U.S. Cl. ..................... 210/238; 210/266; 210/282; 210/286; 210/338; 210/416.3; 210/470
[58] Field of Search ............. 210/266, 282, 416.1, 210/416.2, 416.3, 416.4, 416.5, 338, 286, 470, 767, 232, 237, 238, 541, 542; 417/544, 238, 319, 234; 285/13, 14; D8/307, 308, DIG. 10; D15/142

[56] References Cited

U.S. PATENT DOCUMENTS

| | | | |
|---|---|---|---|
| 2,892 | 12/1842 | Bishop | 210/416.3 |
| 341,923 | 5/1886 | Laing et al. | 417/544 |
| 415,927 | 11/1889 | Stiles | 210/416.3 |
| 472,547 | 4/1892 | Nordtmeyer | 210/416.3 |
| 1,906,391 | 5/1933 | McKinley | 210/413 |
| 2,338,417 | 1/1944 | Forrest et al. | 210/416.5 |
| 2,338,418 | 1/1944 | Forrest et al. | 210/416.5 |
| 2,434,958 | 1/1948 | Quinn | 210/232 |
| 2,436,077 | 2/1948 | Robertson | 210/416.3 |
| 2,473,986 | 6/1949 | Booth | 210/416.3 |
| 2,526,656 | 10/1950 | Goetz | 210/416.3 |
| 2,566,371 | 9/1951 | Quinn | 210/416.3 |
| 2,670,081 | 2/1954 | Quinn | 210/416.3 |
| 3,289,847 | 12/1966 | Rothemund | 210/282 |
| 3,327,859 | 6/1967 | Pall | 210/282 |
| 3,469,696 | 9/1969 | Petrucci et al. | 210/282 |
| 3,715,035 | 2/1973 | Teeple, Jr. et al. | 210/49 |
| 3,730,651 | 5/1973 | Ellis | 417/234 |
| 3,950,253 | 4/1976 | Stern | 210/282 |
| 3,995,966 | 12/1976 | Blancha | 417/254 |
| 4,013,562 | 3/1977 | Gott | 210/232 |
| 4,151,092 | 4/1979 | Grimm et al. | 210/359 |
| 4,187,173 | 2/1980 | Keefer | 210/23 H |
| 4,196,081 | 4/1980 | Pavia | 210/94 |
| 4,277,333 | 7/1981 | Coppola | 210/96 |
| 4,298,475 | 11/1981 | Gartner | 210/266 |
| 4,339,311 | 6/1983 | La Freniere | 210/198 |
| 4,430,213 | 2/1984 | Ishikawa | 210/136 |
| 4,443,336 | 4/1984 | Bennethum | 210/238 |

(List continued on next page.)

FOREIGN PATENT DOCUMENTS

660024 10/1951 United Kingdom .
WO8810239 12/1988 WIPO .

OTHER PUBLICATIONS

*Katadyn Pocket Filter,* Katadyn U.S.A., Inc. Scottsdale, Ariz.
REI Catalog, published Spring 1991, p. 32.

*Primary Examiner*—Cynthia L. Nessler
*Attorney, Agent, or Firm*—Duft, Graziano & Forest

[57] ABSTRACT

A portable, manually-operated water filtration pump for purifying water. The pump includes an inexpensive, disposable filter cartridge which can be easily changed when the filter elements are no longer effective. The pump uses a lever to actuate a double-acting piston. The lever is collapsible to one side of the pump for compact storage. The filter cartridge is a tubular cylinder having an inner bore forming the pump cylinder. A cylindrical mechanical filter is concentric with and adjacent to the inner bore to filter out particulates larger than 0.3 microns. A fluidized granular activated charcoal filter surrounds the mechanical filter to absorb chlorine and chlorine-related compounds such as herbicides and pesticides. The pump pumps into a bottle adaptor which will fit most standard water containers. A prefilter is provided to screen out large particulates from the pump to enhance the life of the filter elements. The prefilter is weighted such that it will sink in water sources and to keep the prefilter inlet upright in still water or downstream in moving water.

18 Claims, 7 Drawing Sheets

U.S. PATENT DOCUMENTS

| | | | |
|---|---|---|---|
| 4,477,347 | 10/1984 | Sylva | 210/416.3 |
| 4,495,068 | 1/1985 | Rosaen | 210/91 |
| 4,500,425 | 2/1985 | Thornton et al. | 210/136 |
| 4,515,378 | 5/1985 | Marshall | 277/152 |
| 4,540,489 | 9/1985 | Barnard | 210/338 |
| 4,605,499 | 8/1986 | Wise | 210/82 |
| 4,622,136 | 11/1986 | Karcey | 210/168 |
| 4,632,757 | 12/1986 | Rosenberg | 210/414 |
| 4,894,154 | 1/1990 | Roz et al. | 210/266 |
| 4,913,808 | 4/1990 | Haque | 210/93 |
| 5,004,536 | 4/1991 | Geisler | 210/136 |
| 5,019,252 | 5/1991 | Kamei et al. | 210/416.3 |
| 5,066,391 | 11/1991 | Faria | 210/85 |
| 5,092,990 | 3/1992 | Muramatsu et al. | 210/136 |
| 5,106,500 | 4/1992 | Hembree et al. | 210/266 |
| 5,116,502 | 5/1992 | Ferguson | 210/266 |
| 5,120,437 | 6/1992 | Williams | 210/244 |
| 5,126,041 | 6/1992 | Weber et al. | 210/136 |
| 5,266,196 | 11/1993 | Fife et al. | 210/416.3 |
| 5,268,093 | 12/1993 | Hembree et al. | 210/136 |
| 5,366,642 | 11/1994 | Platter et al. | 210/416.3 |

WATER FILTRATION PUMP WITH DISPOSABLE FILTER CARTRIDGES

BACKGROUND OF THE INVENTION

1. Field of the invention

This invention relates to the field of water purification units, in particular, portable water filtration pumps for back-country or travel use and other applications where manual water purification is required.

2. Statement of the problem

Water purification is a critical problem in today's world. While presently there are a large number of systems available for home and industrial purification, a strong need exists for a portable system of water purification, particularly for a lightweight, compact water filtration unit. Such a unit is necessary for purifying water sources for travelers, campers, backpackers, fishermen, hunters, rafters, in emergency situations, and the like.

Water sources, even those that appear to be clear, are often contaminated. Water contaminants include particulate matter, chemicals, insects, nematodes, fungi, algae, yeasts, microorganisms, discoloration and radioactive contamination. The microorganisms often found in water sources include pathogenic microbes such as protozoa (which includes Giardia Lamblia), bacteria and viruses. Chemicals often found in water sources include chlorine, herbicides, and pesticides.

Present portable systems for water filtration are of three types: boiling, chemical treatment, and mechanical filtration. Boiling water is time consuming and requires the need for fire. Also, boiling water will only kill microorganisms. It does not remove the contaminants. Chemical treatments, such as iodine tablets, leave an aftertaste, and may produce an allergic reaction with some people. Also, chemical treatments will only kill microorganisms and do not remove contaminants.

Only mechanical filtration units remove the contaminants from the water. Typically, mechanical filtration units are of two types, passive filtration units and pump filtration units.

Passive filtration systems typically use a water bag having a filtration system in the bottom of the bag. Water is poured into the bag which is then hung onto a tree or elevated structure. Water flows downward due to the force of gravity through the filters in the bag and into a reservoir. This type of system is cumbersome to transport, operates slowly and requires frequent replacement of the filters due to bacteria growth in the filters.

There are presently several pump-type water purifiers available on the market. One such device is the FIRST NEED WATER PURIFIER, available from General Ecology, Inc. 151 Sherree Blvd, Lionville, Pa. This purifier uses a handle to move a pump piston vertically in a cylinder. A canister containing a charcoal filter is mounted parallel to the cylinder and is connected by plastic tubing to the cylinder. The bottom of the cylinder has another piece of tubing which is placed in the water source. The bottom of the canister has a short piece of tubing which is placed in the water container. Operation of the handle pumps water through the canister to filter the water. This system weighs approximately sixteen ounces and requires frequent sterilization of the filter by chlorine to prevent bacteria growth. The canister requires replacement at periodic intervals. The replacement canisters are relatively expensive. This system under normal usage purifies water at the rate of one quart per ninety seconds. A prefilter is recommended for use with this system.

Another popular portable water purification filter is manufactured by Katadyn. This system uses a ceramic filter. It also uses a handle type pump to move water through the system. This system is expensive compared with other devices.

A third commercially available water filter pump is the MSR WATERWORKS FILTER, manufactured by Mountain Safety Research, Seattle, Wash. This system uses a small, horizontally-mounted pump with a lever handle to pump water through an articulated urethane foam prefilter, fine mesh stainless steel screen, a cylinder of activated carbon and a micro-porous membrane cartridge having a pore size ratio of 0.1 micron absolute. This system screws on to a water container. This system is relatively expensive with expensive replacement filters. The approximate weight of this system is 20 ounces. Other devices are known that using a separate pump and filter mechanism. These devices are cumbersome to operate and are relatively slow to filter water.

There presently exists a need for a lightweight, compact, inexpensive water purification pump that operates with uniform flows at high rates with extensive exertion.

Solution to the Problem

The present invention provides a solution to these and other problems. The present invention provides a lightweight pump weighing approximately four to five ounces.

The present invention provides a compact pump for ease of storage and transportation.

The present invention provides an inexpensive pump using disposable, inexpensive filters capable of filtering approximately 100 gallons of water per filter.

The present invention provides a pump using mechanical advantage to filter at a rate of 1.5 liters per minute over an elevation of 3 feet.

The present invention provides a vertical, double-acting pump that provides uniform flow rates and uniform pressure rates to allow ease of operation.

The present invention provides a prefilter to screen out large particles and to hold the prefilter in the water source.

The present invention provides an adaptor for filling water containers without the need for holding the water containers.

These and other features will be evident from the ensuing description of the invention.

SUMMARY OF THE INVENTION

The present invention provides a portable, manually-operated, water filtration pump for contaminated water. The pump uses a lever to actuate a piston. The lever is collapsible to one side of the pump for compact storage. The pump includes an inexpensive, disposable filter cartridge which can be easily changed when the filter elements are no longer effective. The filter cartridge is a tubular cylinder having an inner bore in which the piston is movable.

An inlet having a screen mesh is located at the bottom of the inner bore of the filter cartridge. A check valve is provided adjacent the inlet to allow water to enter during the upstroke of the piston but prevents water from leaving during the downstroke of the piston. A flexible seal is provided on the piston which prevents water from flowing around the piston during the upstroke but allows water to flow around the piston during the downstroke. This provides a double-acting piston with uniform flow and uniform pressure during the pumping process.

Water is pumped from the inner bore through a baffle into an inner plenum. The baffle prevents high velocity jet flow to assure a laminar flow into the inner plenum. The inner plenum has an annular width chosen to minimize pressure drops and to promote uniform flow through the filter. A cylindrical mechanical filter is concentric with the inner bore adjacent the inner plenum to filter out particulates larger than 0.1 micron. A fluidized granular activated charcoal filter surrounds the mechanical filter to absorb chlorine and chlorine-related compounds such as herbicides and pesticides. A screen prevents the granular activated charcoal from moving through the system.

An outer plenum is provided for the treated water to exit the charcoal filter in a uniform flow. The outer plenum is connected through an outlet to a bottle adaptor which will fit most standard water containers. The adaptor will prevent spillage of the treated water in the container during the pumping process or contamination of the treated water.

A prefilter is provided to screen out large particulates from the pump to enhance the life of the filter elements. The prefilter is either weighted on one portion or connected by an offset inlet opening to sink the prefilter in water sources and to keep the prefilter inlet upright in still water or downstream in moving water.

The pump of the present invention is designed to be relatively inexpensive and uses recyclable inexpensive filters. The pump is lightweight, approximately 0.25 to 0.32 pounds, capable of pumping greater than 1.5 liters per minute in normal use and is compact, about eight inches long with a diameter of about 2 inches. The pump is formed of lightweight durable components to withstand rugged use and can be easily used by one person.

These and other features will become evident from the detailed description of a preferred embodiment taken in conjunction with the drawings.

DETAILED DESCRIPTION OF A PREFERRED EMBODIMENT

The present invention comprises a portable, compact, lightweight water filtration pump which effectively filter out particles down to 0.1 to 1.0 microns (a micron equals one-millionth of a meter). The pump of the present invention provides a uniform flow at rates greater than 1.5 liters per minute with normal usage. The pump is easily usable by one person with minimal exertion. This device is relatively inexpensive and uses inexpensive, disposable filters which are usable to purify up to 100 gallons of water. The disposable filters are recyclable and easy to change.

One possible preferred embodiment is illustrated in FIGS. 1–6. This description of a preferred embodiment is for explanatory purposes and is not meant to limit the scope of the claimed inventive concept. Other variations and embodiments are considered to be within the scope of the claimed inventive concept.

Figure 1:
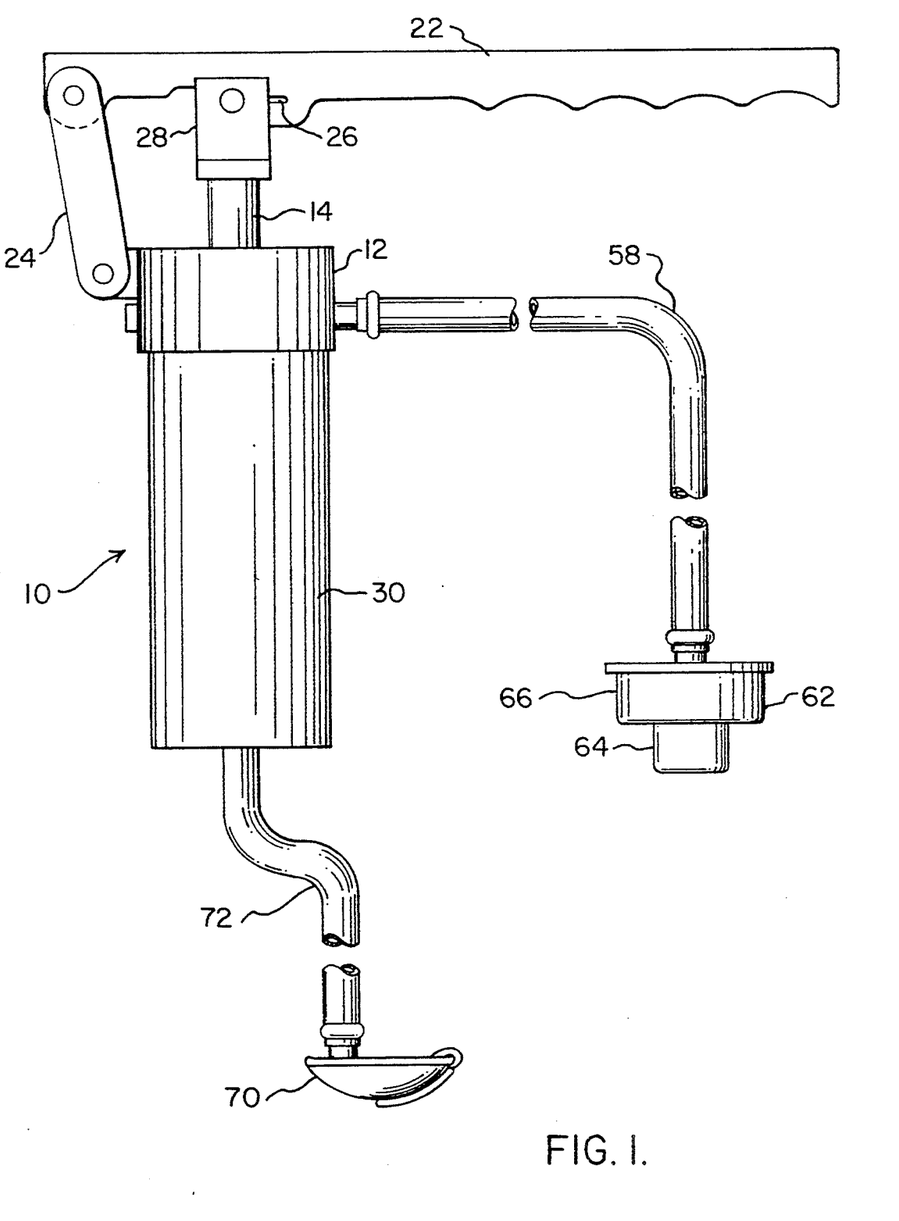
FIG. 1 is a side view of one possible preferred exemplary embodiment of the invention.
Figure 2:
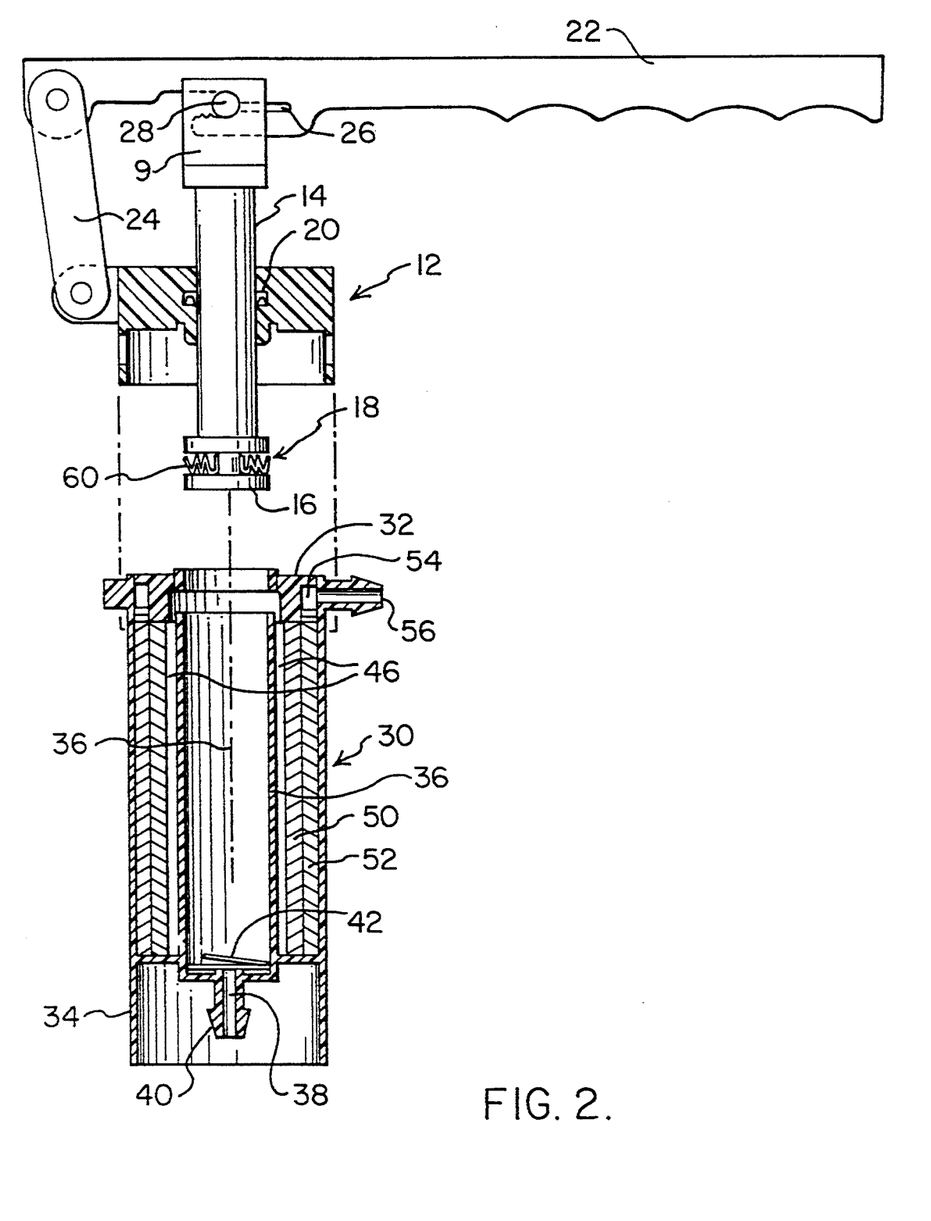
FIG. 2 is a cutaway view of the pump of FIG. 1 disassembled from the disposable filter cartridge.

Water filtration pump 10 of the present invention is shown in FIG. 1. Pump 10 includes prefilter 70 and container adapter 62, both of which are discussed fully below. Pump 10 includes pump housing 12, as shown in FIG. 2, having a cylindrical shape and an inner bore in which piston rod 14 is slidable therein. Piston 16 is formed or mounted on one end of piston rod 14. Seal groove 18 is formed around the circumference of piston 16 as described below. O-ring seal 20 or another well-known type of seal is mounted in housing 12 allowing piston rod 14 to pass through housing 12 while preventing water from the force of piston 16, as described below, from passing upward through housing 12 or contaminates from passing down through housing 12. Cross head 9 is affixed to the upper end of piston rod 14.

Lever 22 engages the upper end of piston rod 14 by slot 26 formed in lever 22 which engages pin 28 on piston rod 14 by a resilient detent formed on slot 26. Lever 22 is attached to housing 12 by pivot link 24. This allows lever 22 to move piston 16 up and down in cartridge 30 as described below with a mechanical advantage. In the embodiment described, the mechanical advantage is three to five times. This enables the lever to exert three to five times the force as would the same effort moving piston 16 up and down without the lever advantage.

Figure 3:
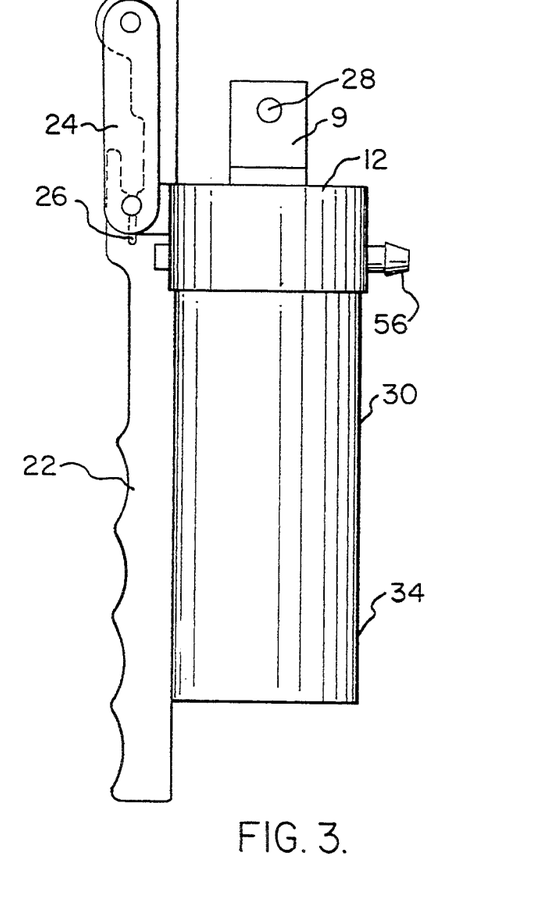
FIG. 3 is a cutaway view of the pump of FIG. 1 with the handle in the storage position.

Lever 22 is designed to be moved to a storage position when pump 10 is not in use. Lever 22 is unhooked from pin 28 and collapsed to one side of pump 10 as shown in FIG. 3. This provides a compact unit for storage and transportation. This can be an important concern for travelers and backpackers who have limited space available.

Cartridge 30 is designed to be quickly and easily attached to housing 12. In the described preferred embodiment, this is accomplished by a screw mounting attachment. Cartridge 30 is screwed into the lower portion of housing 12 and rotated until the mounting is secure. Seal 32 is provided between housing 12 and cartridge 30 to prevent leakage at the connection between the housing 12 and cartridge 30. The present invention is not meant to be limited to this descriptive embodiment but encompasses other variations. For instance, the cartridge may use a bayonet attachment, or a snap-on attachment, or other well-known attachment devices.

As shown in FIG. 2, cartridge 30 includes a tubular plastic cylinder 34. Inner bore 36 is formed in cartridge 30 having an inner diameter that enables piston 16 to closely fit within along with a flexible seal as discussed below. At the lower end of inner bore 36 is an inlet 38 for allowing untreated water to enter into cartridge 30. A screen mesh (not shown) is mounted within inlet 38 to screen large particles out of inner bore 36. In the preferred embodiment, inlet 38 includes an extended outer barb 40 on which a section of tubing is attached. Inlet check valve 42 is mounted in inner bore 36 adjacent inlet 38. Inlet check valve 42 is a cantilevered reed valve which allows water to enter cartridge 30 but prevents water from exiting through inlet 38. The operation of inlet check valve 42 is discussed below.

Figure 4:
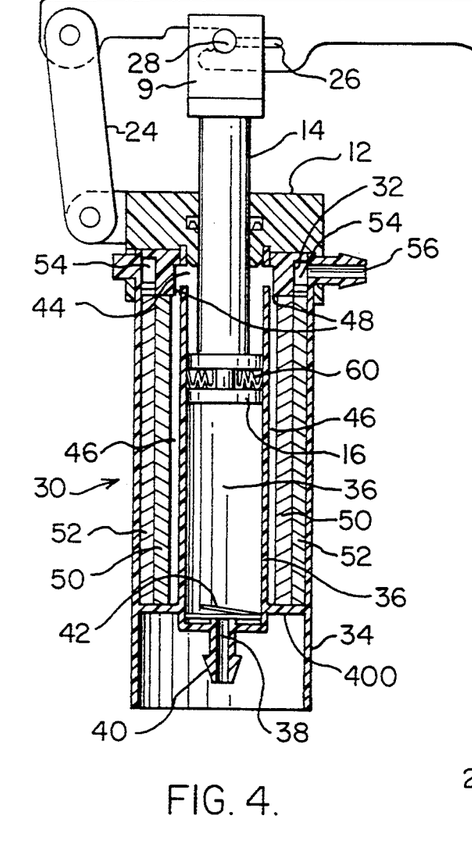
FIG. 4 is a cutaway view of the pump of FIG. 1 with the handle in the operating position and the piston in an upstroke.
Figure 5:
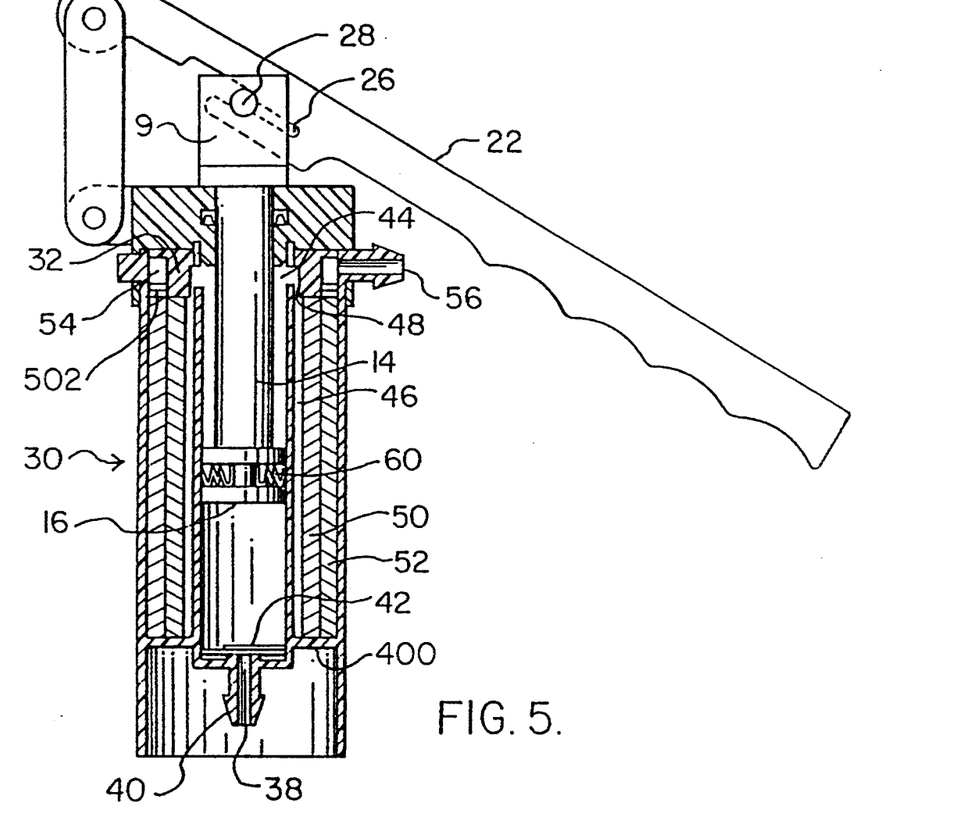
FIG. 5 is a cutaway view of the pump of FIG. 1 with the piston in a downstroke.

Inlet 44, shown in FIGS. 4 and 5, is formed at the upper end of inner bore 36 leading into inner plenum 46. Inner plenum 46 surrounds inner bore 36 and is critically sized as discussed below. Baffle 48 is formed in inlet 44 to prevent high jet velocity flow into inner plenum 46 and to provide laminar flow from inner bore 36 into inner plenum 46. Adjacent inner plenum 46 is mechanical filter 50. Mechanical filter 50 is a borasilicate cylinder, or a plastic membrane cylinder, or a porous plastic tubular cylinder having pores filtering out particles having a size greater than 0.1 to 1.0 microns from exiting the pump. In the preferred embodiment, 0.3 microns is used as the filter size. This size effectively filters most particle contaminates that may feasibly be filtered. Mechanical filter 50 is sealed at the top against seal 32 and at the bottom against lower end 400 of filter cartridge cylinder 30 by mechanical interference.

Granular activated carbon bed filter 52 surrounds mechanical filter 50. Granular activated carbon bed filter 52 is a tubular cylinder formed from fluidized granular activated charcoal with a particle size to maximize absorption of chlorine, chlorine-related products and other chemicals, such as herbicides and pesticides. The fluidized granular activated charcoal provides an efficient absorption rate with a low pressure drop. In the preferred descriptive embodiment, fluidized granular activated charcoal filter 52 filters approximately one hundred gallons of water.

The lower end of fluidized granular activated charcoal filter 52 is sealed by mechanical interference against lower end 400 of filter cartridge 30. Outer plenum 54 is formed at the upper end of filter 52. Outer plenum 54 is in the shape of an annular ring formed around the top of fluidized granular activated charcoal filter 52. Outlet 56 is connected to outer plenum 54 and includes a hose barb 58 for attachment to a section of tubing as discussed below.

Flexible seal 60 is mounted within groove 18 of piston 16 as illustrated in FIGS. 2, 4 and 5. Seal 60 is formed from an elastomer or an elastomer-like thermoplastic. Seal 60 is such, that when mounted within groove 18 (FIG. 2) of piston 16, piston 16 is double acting to provide uniform flow and pressure during both the upstroke and downstroke of piston 16. Seal 60 has an accordion-like, flexible lip that moves toward the wall of inner bore 36 during the piston upstroke so water above piston 16 is forced around the top of inner bore 36 and through baffle area 48 (FIG. 4) and into inner plenum 46. At the same time, water is being drawn upward through inlet 38 and through the open inlet check valve 42 as shown in FIG. 4. The outer lip of seal 60 moves away from the wall of inner bore 36 during the downstroke of piston 16 by the force of the water as shown in FIG. 5. The water below piston 16 is forced downward, thus closing cantilevered reed check valve 42 or similar valve to force the water upward around piston 16 and by seal 60 as shown in FIG. 5.

The use of a double-acting piston provides a uniform flow rate giving a uniform pressure drop. Double-acting piston 16 minimizes the pressure drop to provide a uniform flow rate. This reduces the force necessary to operate the pump and reduces the potential of damage to the filter elements and to the pump.

The internal volume of inner bore 36 and the dimensions of piston rod 14 are chosen so the volume of water displaced during the upstroke of the piston is equal to the volume of water displaced during the downstroke of the piston to further assure uniform flow and minimal pressure drop. The water displaced in the downstroke is equal to the volume of the inner bore 36 minus the volume of piston rod 14. The water displaced in the upstroke is equal to the volume of piston rod 14. Therefore, the volume of piston rod 14 must equal the volume of inner bore 36 minus the volume of piston rod 14. The dimensions of piston rod 14 and inner bore 36 can thus be varied to achieve the desired dimensions.

The dimensions of inner plenum 46 are also chosen to minimize pressure drops and to provide uniform flow through pump 10. Inner plenum 46 is designed as an annulus around inner bore 36 with a width t between the range of 0.02 to 0.05 of the diameter of the entire filter and a length Lp. A width smaller than this range creates a high pressure drop in inner plenum 46. A width greater than this range causes non-uniform flow through the filter creating high pressure drops in the filter. Outer plenum 54 is sized to provide uniform flow out of the filter as well.

Outlet barb 56 (FIG. 2) is connected to a section of tubing 58, illustrated in FIG. 1, leading to water container adaptor 62. Adaptor 62 is designed to closely fit within the openings of most standard water containers. As shown in FIG. 1, adaptor 62 has a first section 64 to fit smaller openings and a second section 66 to fit larger openings. This allows hands free operation of the device without having to hold the water container being filled. The fit of adaptor within the water container opening is such that should the water container tip or fall over, treated water will not spill out and contaminates will not enter the water container. Adaptor 62 can also be designed to screw into the openings of the water containers. Tubing 58 can be clamped or bonded onto outlet hose barb 56 and onto adaptor 62 if desired.

Cartridge inlet 38, as illustrated in FIG. 2 is connected to prefilter 70 (FIG. 1) by tubing 72. If desired, tubing 72 can be securely attached by clamps or bonding to inlet 38 over hose barb 40 and to prefilter 70 over hose barb 74 shown in FIG. 6. Typically, a 0.25 to 0.38 inch internal diameter elastomer or plastic tubing is used at a length up to 3 feet long. Prefilter 70 is dropped into a water source to filter out large particle contaminates down to 70 to 120 microns in size. Pump 10, under normal usage, is able to "pull" water easily at least through an elevation of 3 feet. This allows the user to comfortably operate the pump without kneeling or actually getting into the water source.

Figure 6:
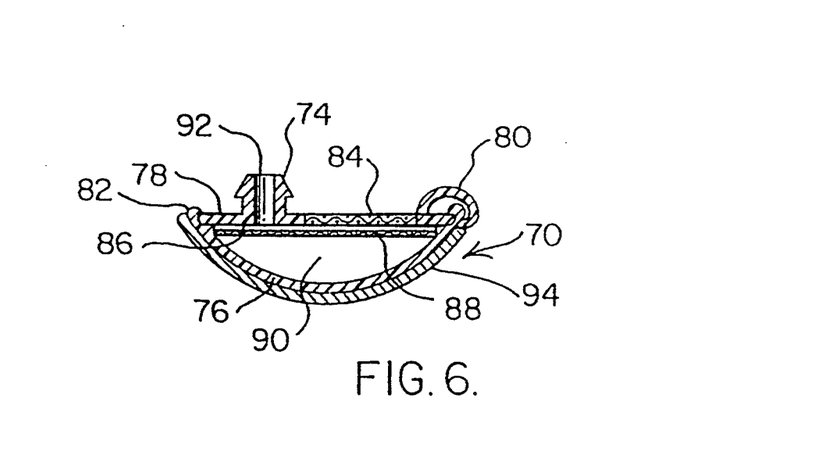
FIG. 6 is a cutaway view of the prefilter of the preferred embodiment.

As illustrated in FIG. 6, prefilter 70 has a semi-spherical-shaped lower portion 76. Upper portion 78 is attached to lower portion 76 by living hinge 80 and snap-lock 82 so that upper portion 78 can be easily opened to clean prefilter 72. Inlet opening 84 having a molded or woven or metal mesh screen with 0.01 to 0.02 millimeter pore size, is formed in upper portion 78. Filter screen 88 is mounted in the interior 90 of lower portion 76 formed of either metal or plastic and filtering particles larger than 100 to 150 microns. Outlet 92 is formed on upper portion 78 at a location approximately one-third the radial length of the prefilter.

Water is drawn by pump through inlet screen 84 down through filter screen 88 into the interior 90 and out through outlet 92 up through tubing 72 into inlet 38 of cartridge 30 of pump 10. The prefilter screens large particle contaminates from pump 10 to increase the life of disposable cartridges 30. Upper portion 78 (FIG. 6) can be unsnapped to clean each of the filters 86 and 88 as necessary.

Weighted portion 94 is molded, formed or attached to lower portion 76 of prefilter 70. Weighted portion 94 can be attached to only a portion of lower portion 76 as shown in FIG. 1 or be attached to the entire lower portion 76 as shown in FIG. 6. Weighted portion 94 accomplishes three functions. First, prefilter 70 sinks in moving and still water beneath the surface of the water source. The majority of contaminates typically float on the surface, thus by sinking below the surface, prefilter 72 misses the surface contaminates. Second, in still water, prefilter 70 is held with inlet opening 84 in an up position to prevent bottom dirt from being pulled into prefilter 70. Third, weighted portion 94, or the offset location of the hose barb, moves the center of gravity of prefilter 70 to one side. In moving water, this will cause weighted portion 94 to move downstream first, thus tilting upper portion 78 and inlet opening 84 in the downstream position. This prevents waterborne large particles from flowing into inlet opening 84 and reducing clogging of prefilter 70.

Prefilter 70 is designed to be small, lightweight, inexpensive and to create an insignificant pressure drop to allow uniform flow through pump 10. In the descriptive preferred embodiment, prefilter 70 has an outer diameter of less than 1.75 inches and a pressure drop of less than 0.25 psi at a flow rate of 1.2 quarts per minute.

Figure 7:
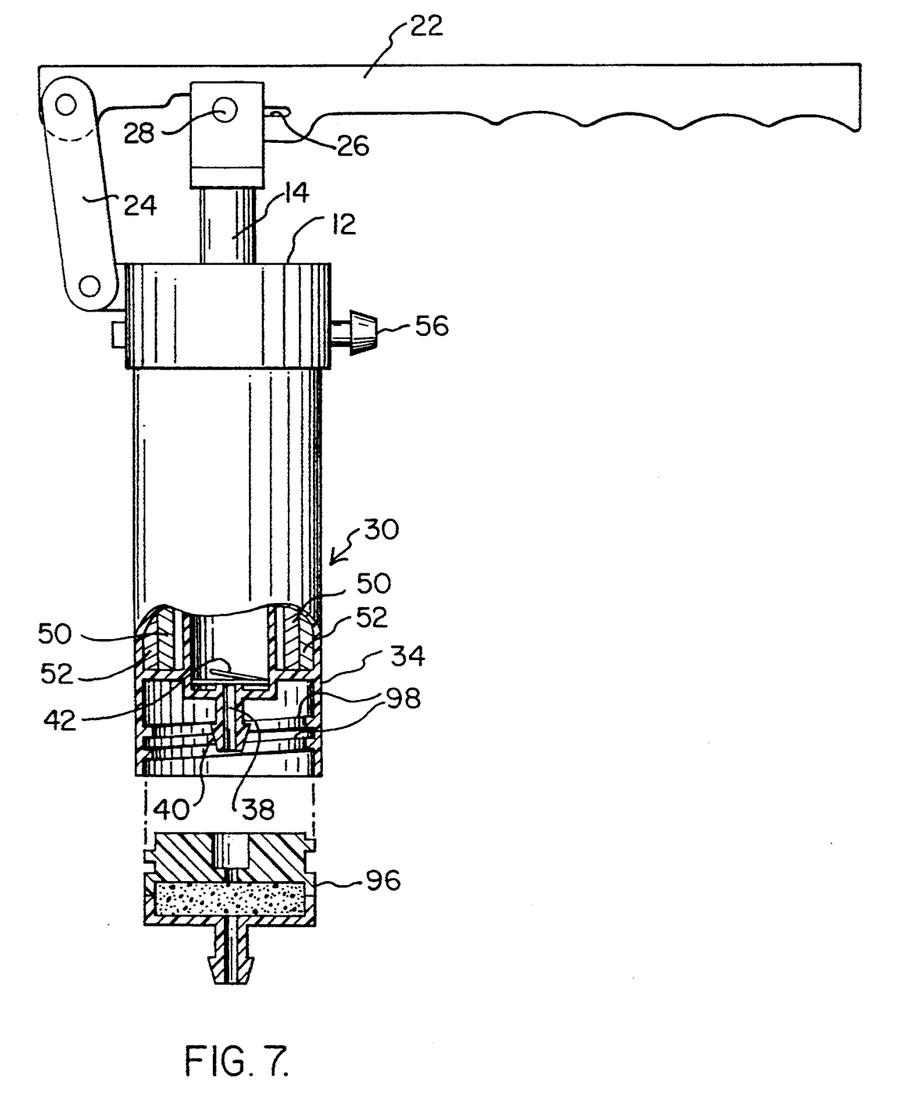
FIG. 7 is a view of a pump of the preferred embodiment with a pre-conditioning unit attached.

Cartridge 30 is adapted to be fitted with additional pre-conditioning or post-conditioning units for further purification of water. For instance, as illustrated in FIG. 7, pre-conditioning unit 96 is attached to the lower end of cartridge 30 by a screw-on attachment 98. Pre-conditioning unit 96 contains an iodine-coated resin bed to kill viruses, bacteria, and the like which are too small to be filtered out. Fluidized granular activated charcoal filter 52 then filters out the iodine compounds from the water.

In one embodiment, pump 10 is designed for lightweight, compact storage for use in travel or backpacking. Pump 10 has an overall length with lever 22 in storage position of about eight inches with filter cartridge 30 having a two inch diameter and a five inch length. The overall weight is 0.25 to 0.32 pounds. Pump 10 filters water under normal usage at a rate greater than 1.5 liters per minute. Cartridge 30 will last for approximately 100 hundred gallons under normal usage. Cartridge 30 is inexpensive and easily replaced after filters 50 and 52 are no longer effective. Also, cartridges 30 may be replaced after periods of non-use in order to prevent the effects of bacteria growth if the filters were not sterilized after use. The used filter cartridges are designed to be recyclable. These design parameters are for descriptive purposes. Other sizes and designs are considered to be encompassed by the claimed invention.

Pump 10 and the housing of cartridge 30 are formed from polycarbonate or nylon 616 with lever 22 formed from glass-filled polycarbonate or nylon 616 to be lightweight yet durable. Mechanical filter 50 is formed from borasilicate, or porous plastic to be durable. Previous devices using silver impregnated ceramic tended to be fragile, with some fear of the effect of silver impregnation on drinking water. The use of fluidized granular activated charcoal provides a more efficient absorption with a lower pressure drop than many charcoal filters. The above description is for explanatory purposes and is not meant to limit the invention as claimed. Other materials, pump designs and filter designs are considered to be within the claimed inventive concept.

Weighted prefilter 70 and water container adaptor 60 allows pump 10 to be used by a single person without the need for additional assistance or contortions in filtering from a stream or other water source. Lever 22 provides a mechanical advantage to greatly increase the efficiency of the pumping action at an easy exertion rate. These features combine to provide an efficient water purification device that is easily operated.

In operation, pump 10 is transported with lever 22 in the storage position as shown in FIG. 3. When it is desired to purify water from a water source, lever 22 is unfolded and moved into the operating position where slot 26 engages pin 28 of piston rod 14 (FIG. 1) Water container adaptor 62 (FIG. 1) or 620 (FIGS. 17, 18 or 19), is inserted into the opening of a water container. Prefilter 70 (FIG. 6) is dropped into the water source. Lever 22 is operated up and down to pump water from the water source through prefilter 70 and into pump 10. The water is moved by double-acting piston 16 through mechanical filter 50 to remove particulate contamination, then through carbon-bed filter 52 to remove chemical contamination. The water is then pumped through outlet 56 and into the water container. After approximately 100 gallons has been pumped or after extended periods of non-use of the pump, cartridge 30 can be quickly and easily replaced by a new cartridge. The old cartridge is then able to be recycled.

Figure 8:
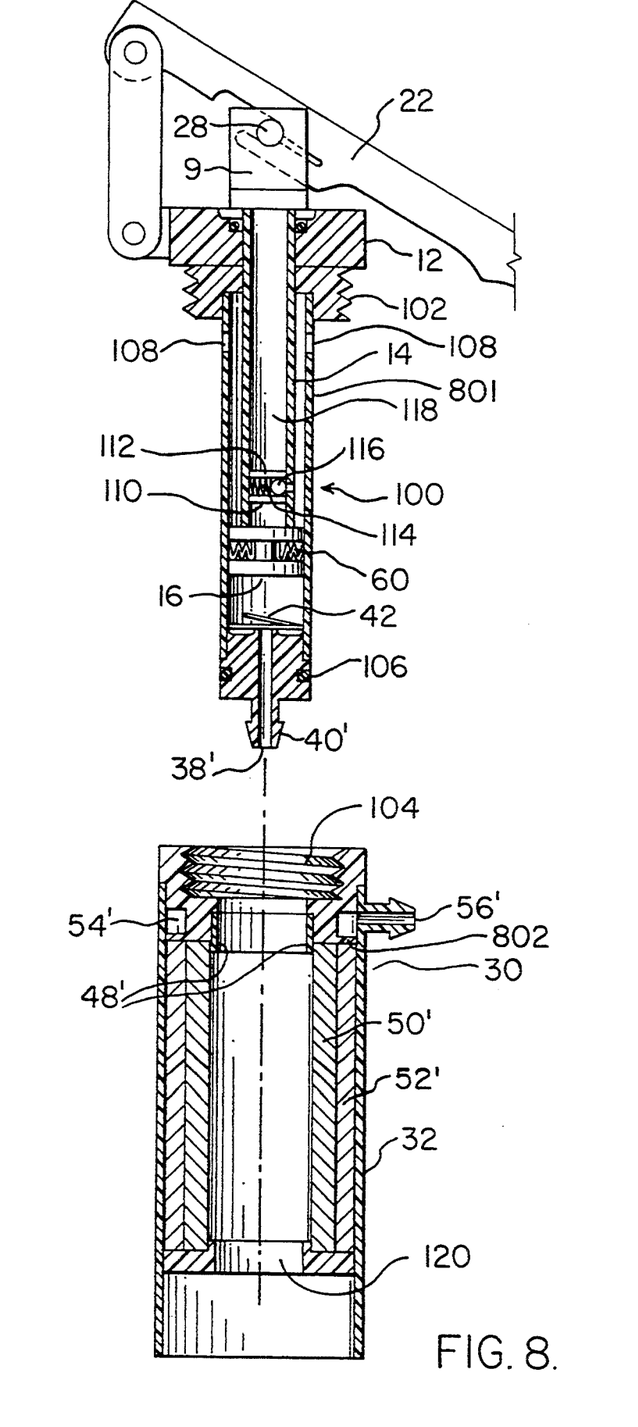
FIG. 8 is a cutaway view of a second preferred embodiment of the present invention.
Figure 9:
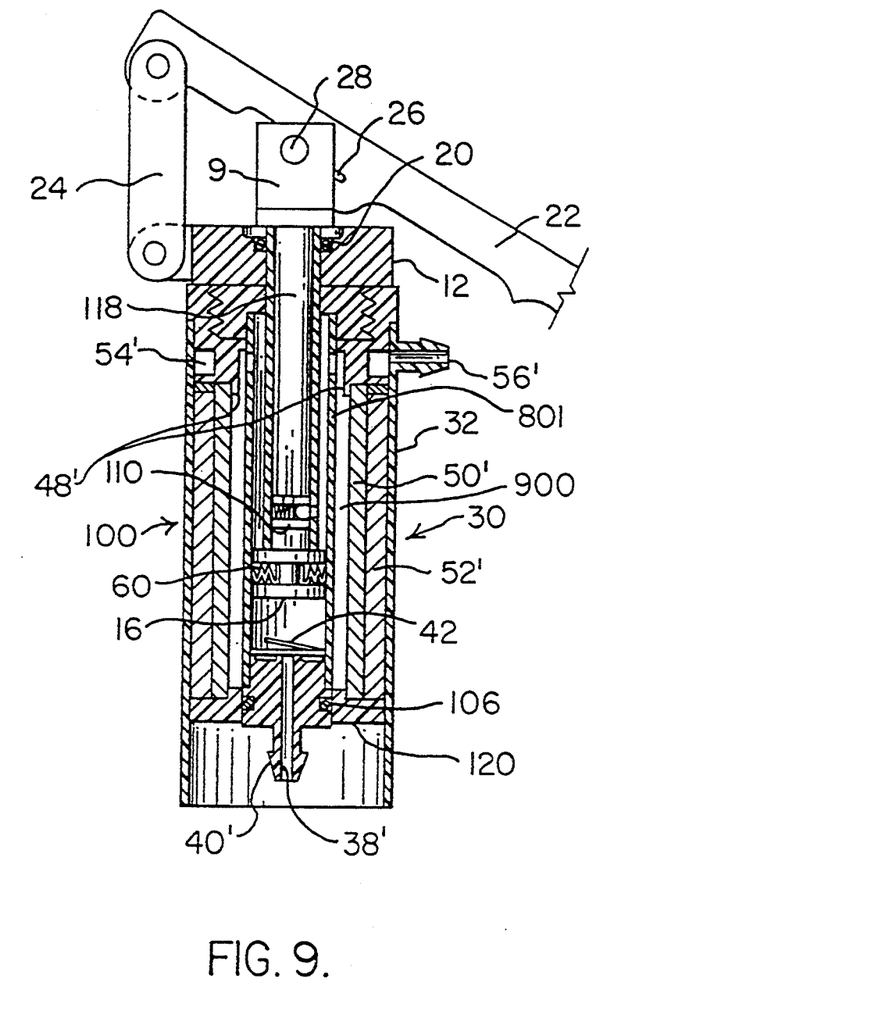
FIG. 9 is a cutaway view of the embodiment of FIG. 8 assembled.

A second possible preferred embodiment is illustrated in FIGS. 8 and 9. This embodiment operates similar to the above-described embodiment. As illustrated in FIG. 8, an inner pump cylinder 100 is formed on pump housing 12. Inner pump cylinder 100 includes threaded attachment 102 which mates with threaded attachment 104 on cartridge 30. Cartridge 30 has an inner mechanical filter 50', identical to filter 50 described above, carbon bed filter 52', identical to carbon bed filter described above, lip 802 similar to lip 502 of FIG. 5, and outlet plenum 54' attached to outlet 56' both similar 54 and 56 described above.

Inner pump cylinder 100 includes an inlet opening 38' which opens through inlet valve 42 into inner pump cylinder 100. O-ring 106 is mounted near the bottom of inner pump cylinder 100 adjacent inlet opening 38' and barb 40'. Inner pump cylinder 100 has a thin-walled casing 108 in which piston 16 is movable. Seal 60 interacts with inlet valve 42 to provide the double-acting performance described above.

Pressure relief valve 110 is also illustrated in FIGS. 8 and 9. Pressure relief valve includes radial hole 112 formed in piston rod 14 above piston 16. Longitudinal passage 118 is formed in piston rod 14 communicating with radial hole 112 and an opening formed at the top of piston rod 14. Spring 114 is inserted in radial hole 112 biasing ball 116. The bias is selected so that when pressure builds up in pump cylinder, from clogging of the inlet or outlet openings or other causes, ball 116 is forced inward against spring 114 to allow water to flow up through passage 118 and out of the pump to relieve the pressure build up.

Inner pump cylinder 100 is easily assembled onto pump housing 32 by screwing the threaded elements 102 and 104 together. O-ring sealing ring 106 seals the lower portion of inner pump cylinder 100 against lower portion 120 of the cartridge housing (FIG. 8). Inner plenum 900 (FIG. 9) comprises the space between the outer wall 801 of inner pump cylinder 100 and the inner wall of mechanical filter 50′. The baffle 44 (FIG. 9) works similar as above to create uniform, laminar flow into the filters. The pump works as did the earlier described embodiment to provide uniform pressure and flow through the pump. The second embodiment allows a more inexpensive filter cartridge to be used, since the inner pump cylinder remains with the pump housing. The pre-filters and water container adaptors are usable with both embodiments.

The present invention provides a lightweight, compact, inexpensive filtration unit that is easily used. The claimed invention is not meant to be limited by this description. Other embodiments and variations are considered to be within the inventive scope of the claimed invention.

We claim:

1. A pump for fluid filtration and purification, said pump comprising:
   a housing;
   a piston rod slidably mounted on said housing along a first axis of said housing;
   a piston affixed to an end of said piston rod;
   means for slidably moving said piston rod and said piston relative to said housing;
   a cartridge filter;
   connector means for removably engaging said cartridge filter with said housing, said cartridge filter including:
   an inner bore of said cartridge filter forming a pump cylinder defining means for movably receiving said piston when said cartridge filter is engaged with said housing;
   inlet means formed on a first end of said inner bore of said cartridge filter for enabling fluid to enter into said inner bore when said piston moves away from said inlet means;
   filtering means concentric with and surrounding said inner bore for filtering fluid;
   an inner plenum formed between said inner bore and said filtering means for enabling unfiltered fluid to be pumped from said inner bore and through said inner plenum and said filtering means in response to movement of said piston within said inner bore;
   baffle means abutting said filtering means and adjacent said inner plenum and a second end of said inner bore for providing uniform laminar flow of fluid pumped from said bore into said inner plenum; and
   outlet means on an upper end of said cartridge filter adjacent said filtering means for enabling filtered fluid to exit said cartridge filter.

2. The pump of claim 1 wherein means for moving said piston include a lever handle providing a mechanical advantage to said piston rod to increase the flow rate of said pump with low force, said lever handle being movable been a first position to move said piston rod and said piston and a second position on one side of said pump for compact storage.

3. The pump of claim 1 wherein said means for moving said piston includes a lever handle, said lever handle being movable from a compact storage position in which it is folded about one end against said housing and disengaged from said piston to a pumping position in which an intermediate location of said lever handle engages said piston to move said piston within said housing at a mechanical advantage when said lever handle is pivoted.

4. The pump of claim 1 wherein said filtering means include:
   a rigid, cylindrical, tubular mechanical filter means concentric with and surrounding said inner plenum for removing particulate contamination; and
   a cylindrical granular activated carbon filter means concentric with and surrounding said mechanical filter means for absorbing chlorine and chlorine compounds.

5. The pump of claim 4 wherein said mechanical filter means filters particulate not less than 0.1 micron.

6. The pump of claim 1 wherein said pump further comprises:
   sealing means on the periphery of said piston for providing a double-acting piston effect to provide uniform fluid flow through said pump when said piston slides within said inner bore;
   said sealing means including means for enabling only the one way flow of fluid past said sealing means and said piston as said piston is moved to pump said fluid; and
   said inner bore has an inner volume equal to twice the volume of said piston rod of said pump so that the volume of fluid displaced when said piston moves away from said inlet means in said inner bore is equal to the volume of fluid displaced when said piston moves toward said inlet means in said inner bore to provide uniform fluid flow through said pump.

7. The pump of claim 6 wherein said inner plenum is formed between said inner bore and said filtering means for providing minimum pressure drop through said filter; and wherein
   said outlet means includes an outer plenum formed adjacent an exit area of said filtering means for providing a low pressured drop through said pump and a uniform flow of fluid out of said pump.

8. The pump of claim 7 wherein said baffle means is formed at an entrance of said inner plenum for preventing high velocity fluid jet flow into said inner plenum and for providing laminar fluid flow from said inner bore into said inner plenum.

9. The pump of claim 8 wherein said baffle means directs the fluid flow from said piston parallel to said filtering means.

10. A pump for fluid filtration, said pump comprising:
    a housing;
    inlet means for enabling fluid to enter said pump and for preventing fluid from exiting said pump through said inlet means;
    a piston slidably positioned within said pump;
    a cartridge filter including cylindrical filtering means surrounding said piston and coaxial with said piston;
    a cylindrical inner bore intermediate said piston and said cylindrical filtering means and forming a surface of a piston cylinder for said piston to slide within;

an inner plenum formed between said piston cylinder and an inner surface of said cylindrical filtering means;

connector means for removably engaging said cartridge filter with said pump housing;

outlet means;

means for slidably moving said piston relative to said housing to pump fluid through said inlet means and through said cylindrical filtering means and said outlet means; and baffle means abutting said cylindrical filtering means and adjacent said inner plenum for directing fluid pumped from said inlet means through said cartridge filter;

said baffle means being effective for directing the fluid flow from said piston parallel to a longitudinal axis of said filtering means at a laminar rate; and said outlet means being disposed at an upper end of said cartridge filter for enabling fluid to exit said pump after the fluid has been pumped through said cartridge filter at a substantially uniform flow.

11. The pump of claim 10 wherein said baffle means is formed near an upper end of said pump cylinder for directing said fluid flow from said cylinder into said filtering means at a laminar flow rate.

12. The pump of claim 10 wherein said inner bore forms a part of said housing and wherein said pump further includes:

sealing means on said piston for providing a double-acting piston;

said sealing means including means for enabling only the one way flow of fluid past said piston and said sealing means as said piston is moved to pump said fluid;

a piston rod having one end affixed to said double acting piston;

said inner bore having an inner volume equal to twice the volume of said piston rod of said double-acting piston;

said inlet means being formed at a lower end of said inner bore; and said baffle means being formed near an upper end of said piston cylinder to direct fluid flow into said inner plenum and into said filtering means at a laminar rate.

13. The pump of claim 12 wherein said baffle means directs the fluid flow from said piston parallel to said filtering means.

14. The pump of claim 10 wherein sealing means on said piston prevents fluid flow past said sealing means during the movement of said piston away from said inlet means and enables fluid to flow past said sealing means during the movement of said piston toward said inlet means; and said inlet means includes inlet valve means for enabling fluid to enter said inner bore during the movement of said piston away from said inlet means and preventing fluid from exiting said inlet means during the movement of said piston towards said inlet means.

15. The pump of claim 14 wherein said sealing means include a seal having a flexible outer lip shaped to move toward an inner surface of said inner bore during the movement of said piston away from said inlet means to prevent fluid flow past said piston during the movement of said piston away from said inlet means, and to move away from said surface of said inner bore during the movement of said piston towards said inlet means to allow fluid flow past said piston during the movement of said piston towards said inlet means.

16. A filter cartridge comprising:

connector means for removably engaging said filter cartridge with a housing of a piston operated pump;

a first tubular filter means for filtering particulate contaminates;

a second filter means comprising an activated carbon bed concentric with and surrounding said first filter means for filtering chlorine and chlorine compounds;

a tubular inner bore within said first filter means forming a pump cylinder to slidably receive a piston of said pump;

inlet means on the bottom of said cartridge for enabling fluid to enter said inner bore;

an inner plenum between said first filter means and said inner bore for providing a low pressure drop of said fluid through said pump and said filter means;

baffle means abutting said first filter means and adjacent said inner plenum for preventing a high velocity jet flow of said fluid into said inner plenum and for providing laminar flow of said fluid into said inner plenum;

an outer plenum between said second filter means and an outlet means on an upper end of said cartridge for providing uniform flow of said fluid out of said cartridge; and said outlet means enabling fluid to exit said filter cartridge after passing through said first filter means and said second filter means and said outer plenum.

17. The filter cartridge of claim 16 wherein said tubular inner bore includes an inner volume equal to twice the volume of the piston rod of said piston so that the volume of fluid displaced during the movement of said piston away from said inlet means is equal to the volume of fluid displaced during the movement of said piston towards said inlet means to provide approximately uniform fluid flow through said filter means and approximately uniform pressure.

18. The filter cartridge of claim 16 wherein said pump has lever means for moving said piston relative to said pump; and said lever means being movable between a first position to move said piston and a second position collapsed to one side of said cartridge for compact storage.

* * * * *